(12) United States Patent
Ohashi et al.

(10) Patent No.: US 7,485,678 B2
(45) Date of Patent: Feb. 3, 2009

(54) PROCESS FOR PRODUCING CARBON NANOTUBE REINFORCED COMPOSITE MATERIAL

(75) Inventors: Toshiyuki Ohashi, Wako (JP); Keiichi Sato, Wako (JP); Kazuhiro Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 426 days.

(21) Appl. No.: 11/088,328

(22) Filed: Mar. 23, 2005

(65) Prior Publication Data

US 2006/0058443 A1   Mar. 16, 2006

(30) Foreign Application Priority Data

Mar. 24, 2004   (JP) ............................. 2004-086034

(51) Int. Cl.
C08J 3/20   (2006.01)
C08L 101/00   (2006.01)
C08K 7/24   (2006.01)

(52) U.S. Cl. .................. 524/495; 524/496; 252/510; 252/511; 423/447.1; 423/447.2

(58) Field of Classification Search ................ 524/495, 524/496; 423/447.1, 447.2; 252/510, 511
See application file for complete search history.

(56) References Cited

FOREIGN PATENT DOCUMENTS

| | | |
|---|---|---|
| EP | 1439248 | 7/2004 |
| JP | 2862578 | 12/1998 |
| WO | WO-03/038837 | 5/2003 |

OTHER PUBLICATIONS

X. Gong et al., "Surfactant-Assisted Processing of Carbon Nanotube/Polymer composites", Chem. Mater., 2000, 12, 1049-52.*
Velasco-Santos, et al., "Improvement of Thermal and Mechanical Properties of Carbon Nanotube Composites through Chemical Functionalization," (2003) *Chemistry of Materials, American Chemical Society*, vol. 15; pp. 4470-4475.
Hirsch, "Functionalization of Single-Walled Carbon Nanotubes," *Angewandte Chemie., International Edition, Verlag Chemie*. (2002) vol. 41, No. 11; pp. 1853-1859.

* cited by examiner

*Primary Examiner*—Irina S Zemel
(74) *Attorney, Agent, or Firm*—Lahive & Cockfield, LLP; Anthony A. Laruentano, Esq.

(57) ABSTRACT

An object is to provide a process for producing a carbon nanotube (CNT) reinforced composite material, wherein CNT is homogeneously dispersed in a resin to obtain the composite material having an excellent mechanical strength. Hydrophilic CNTs 12 are dispersed in a first solvent 11 to prepare a first dispersion liquid 13. The dispersion liquid 13 and a synthetic resin raw material 15 are added to a second solvent 14 and the resulting mixture is stirred to prepare a third dispersion liquid 17 where a second dispersion liquid 16 in which the synthetic resin raw material 15 is dissolved in the dispersion liquid 13 is dispersed in the solvent 14. The solvents 11 and 14 are removed from the dispersion liquid 17 to obtain a mixture of the hydrophilic CNTs 12 and the synthetic resin raw material 15. The mixture is molded to obtain the composite material in which the synthetic resin is reinforced with the hydrophilic CNTs 12. The second solvent 14 has smaller solubility of the synthetic resin raw material 15 than that of the solvent 11, is substantially not compatible to the solvent 11, and has volume larger than that of the solvent 11. The dispersion liquid 17 is sprayed on a substrate and the solvents 11 and 14 are removed to obtain the mixture and simultaneously to conduct molding of the mixture.

22 Claims, 3 Drawing Sheets

PROCESS FOR PRODUCING CARBON NANOTUBE REINFORCED COMPOSITE MATERIAL

BACKGROUND OF THE INVENTION

1. Field of the Invention

The present invention relates to a composite material comprising a resin reinforced with carbon nanotubes.

2. Description of the Related Art

A carbon nanotube is a single tubular molecule where a large number of carbon atoms are continuously bonded in such a state that six-membered rings are formed by $sp^2$ bonding and possesses a structure of nanometer order. The end part of the carbon nanotube is closed with forming a hemispherical structure by incorporating five-membered rings in part. Moreover, the above carbon nanotubes form single-layered tubes, or tubes of various sizes can sometimes be layered in a nested form to form multi-layered tubes.

The above carbon nanotubes are expected to have application to various uses such as one-dimensional wires, catalysts, cold-cathode elements, and hydrogen storage substances owing to mechanical and structural properties derived from its specific structure. In addition, composite materials reinforced with the carbon nanotubes possess excellent functional properties such as electric conductivity.

As the above composite material, a resin composition containing 0.1 to 50 parts by weight of a carbon nanotubes and 99.9 to 50 parts by weight of a synthetic resin is known, for example (Japanese Patent No. 2862578).

The above resin composition contains carbon nanotubes having a diameter of 3.5 to 70 nm and an aspect ratio of 5 or more and a thermoplastic or thermosetting resin in respective amounts of the above ranges and is produced by mixing an aggregate of the carbon nanotubes with the thermoplastic or thermosetting resin.

However, in the above resin composition, it is difficult to homogeneously disperse the carbon nanotubes in the resin because the tube is in an aggregate form. Moreover, the carbon nanotubes have a low chemical activity owing to a structure where a large number of carbon atoms are continuously bonded, and hence is poor in wetting ability toward water and various organic solvents. As a result, the resin composition is week in bonding force between the surface of the carbon nanotubes and the resin and hence has an inconvenience of low mechanical strength such as tensile modulus.

SUMMARY OF THE INVENTION

An object of the present invention is to provide a process for producing a carbon nanotube reinforced composite material, which overcomes such an inconvenience and is capable of homogeneously dispersing carbon nanotubes in a resin to obtain a composite material possessing an excellent mechanical strength.

For achieving such an object, the present invention provides a method for manufacturing a carbon nanotube reinforced composite material comprising hydrophilic carbon nanotubes and a synthetic resin, comprising the steps of:

dispersing the hydrophilic carbon nanotubes in a first solvent to prepare a first dispersion liquid, adding the first dispersion liquid and a synthetic resin raw material to a second solvent and stirring the resulting mixture to prepare a third dispersion liquid where a second dispersion liquid in which the synthetic resin raw material is dissolved in the first dispersion liquid is dispersed in the second solvent, removing the first solvent and the second solvent from the third dispersion liquid to obtain a mixture of the hydrophilic carbon nanotubes and the synthetic resin raw material, and molding the mixture to obtain the composite material where the synthetic resin is reinforced with the hydrophilic carbon nanotubes, wherein the second solvent has smaller solubility of the synthetic resin raw material than that of the first solvent, is substantially not compatible to the first solvent, and has volume larger than that of the first solvent.

In the process of the invention, the hydrophilic carbon nanotubes are first dispersed in the first solvent to prepare the first dispersion liquid. As the above hydrophilic carbon nanotubes, hydrophilic carbon nanotubes where hydrophilicity is imparted by introducing a hydrophilic functional group into the surface thereof can be employed. The above hydrophilic carbon nanotubes can be produced by any method of irradiating raw carbon nanotubes with an ultraviolet ray, subjecting the same to plasma treatment, or subjecting the same to wet treatment with a strong oxidizing agent such as sulfuric acid or nitric acid.

Moreover, the first dispersion liquid is preferably prepared by adding a surfactant to the above first solvent together with the above hydrophilic carbon nanotubes. By adding the surfactant, the hydrophilic carbon nanotubes can be easily dispersed in the first solvent.

Then, the first dispersion liquid and a synthetic resin raw material are added to the second solvent, followed by stirring. Since the second solvent is substantially not compatible to the first solvent and has volume larger than that of the first solvent, the first dispersion liquid forms minute liquid drops to be dispersed in the second solvent.

Furthermore, since the above second solvent has smaller solubility of the synthetic resin raw material than that of the first solvent, the above synthetic resin raw material is once dissolved in the above second solvent and then migrates into the first solvent having larger solubility from the second solvent. As a result, the above first dispersion liquid is changed into the second dispersion liquid where the above hydrophilic carbon nanotubes are dispersed in the first solvent in which the above synthetic resin raw material is dissolved. Then, the third dispersion liquid where minute liquid drops of the second dispersion liquid are dispersed in the second solvent is formed.

Herein, the synthetic resin raw material is a monomer or a prepolymer of the synthetic resin which forms the composite material with the hydrophilic carbon nanotubes.

In the liquid drops of the above second dispersion liquid, the above hydrophilic carbon nanotubes and the above synthetic resin raw material are present in an extremely adjacent state. At this time, when sites mutually having different charges are present in the hydrophilic carbon nanotubes and the synthetic resin raw material, for example, one has a minus charge and another has a plus charge, then the sites attract each other. Therefore, the hydrophilic carbon nanotubes are apt to be surrounded by the molecules of the synthetic resin raw material.

On the other hand, in the above hydrophilic carbon nanotubes and the above synthetic resin raw material, when there are sites having the same charge, i.e., a plus charge and a plus charge or a minus charge and a minus charge, then the sites act repulsively. However, in the above third dispersion liquid, since the liquid drops of the above second dispersion liquid is surrounded by the above second solvent, the above hydrophilic carbon nanotubes and the above synthetic resin raw material are prevented from moving by the second solvent even if they act repulsively and tend to separate from each other. Accordingly, the molecules of the hydrophilic carbon nanotubes and the synthetic resin raw material are still present in an extremely adjacent state.

As a result, the mutually attracting action derived from the sites having mutually different charges of the molecules of the above hydrophilic carbon nanotubes and the above synthetic resin raw material may take precedence. Therefore, the hydrophilic carbon nanotubes may be surrounded by the molecules of the synthetic resin raw material and thus may be homogeneously dispersed in the synthetic resin raw material.

Moreover, in the case that the above first dispersion liquid contains the above surfactant, the surfactant forms micelles which cover the hydrophilic carbon nanotubes in such a state that hydrophilic groups are oriented to the above hydrophilic carbon nanotube side and lipophilic groups are oriented to the side of the molecules of the above synthetic resin raw material. Therefore, the hydrophilic carbon nanotubes are further apt to be dispersed homogeneously in the synthetic resin raw material.

Then, when the first solvent and the second solvent are removed from the above third dispersion liquid, as mentioned above, a mixture where the hydrophilic carbon nanotubes are homogeneously dispersed in the synthetic resin raw material is obtained. Thus, by molding the mixture, the composite material where the above synthetic resin is reinforced by the hydrophilic carbon nanotubes can be formed.

In order to form the composite material, after the first solvent and the second solvent are removed from the above third dispersion liquid by filtration or centrifugation to obtain the mixture, the mixture may be subjected to a method such as injection molding or press molding. However, it is preferred to remove the first solvent and the second solvent from the third dispersion liquid by spraying the third dispersion liquid on a substrate.

In the case that the third dispersion liquid is sprayed on a substrate, a step of removing the first solvent and the second solvent from the third dispersion liquid to obtain a mixture of the hydrophilic carbon nanotubes and the synthetic resin raw material and a step of molding the mixture can be conducted simultaneously. Moreover, by spraying the third dispersion liquid on a substrate, even when the substrate has a complex shape, the composite material where the above synthetic resin is reinforced by the hydrophilic carbon nanotubes can be easily formed along the shape.

DETAILED DESCRIPTION OF THE INVENTION

The following will describe embodiments of the invention further in detail with reference to attached drawings.

The production process of the present embodiment produces a carbon nanotube reinforced composite material comprising hydrophilic carbon nanotubes and a synthetic resin.

As the hydrophilic carbon nanotubes, using carbon nanotubes produced by a method known per se, such as chemical vapor deposition method (CVD method) as a raw material, one obtained by introducing a hydrophilic functional group into the surface of the carbon nanotubes to impart hydrophilicity can be used. Hydrophilicity can be imparted to the above raw carbon nanotubes by any method of irradiating the carbon nanotubes, subjecting the same to plasma treatment or subjecting the same to wet treatment with a strong oxidizing agent such as sulfuric acid or nitric acid. In view of simplicity and convenience for imparting hydrophylicity to the raw carbon nanotubes, the irradiation with an ultraviolet ray or the plasma treatment is preferred.

For example, the raw carbon nanotubes have a diameter ranging from 0.4 to 100 nm and possess an aspect ratio of 10 to 10000. The carbon nanotubes may be single-layered carbon nanotubes or multilayered carbon nanotubes.

Figure 1:
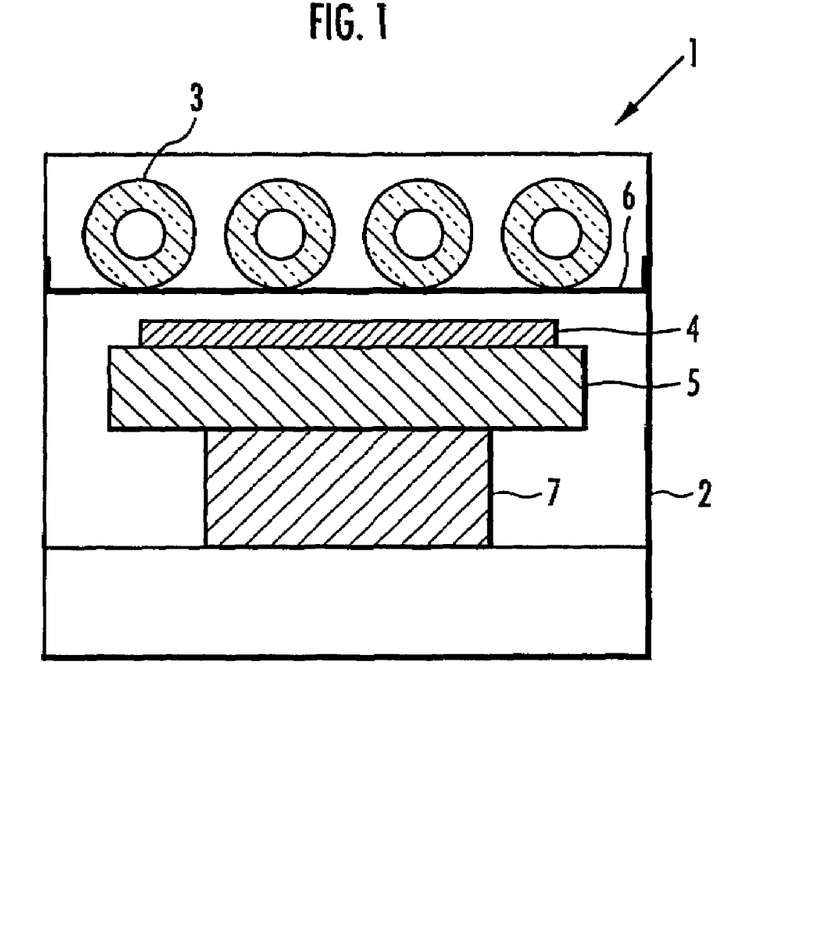
FIG. 1 is an illustrative cross-sectional view showing one constitutive example of an ultraviolet irradiation apparatus to be used for imparting hydrophilicity to carbon nanotubes.

In the case that the above raw carbon nanotubes are irradiated with an ultraviolet ray, an ultraviolet ray irradiation apparatus 1 shown in FIG. 1 is employed, for example. The ultraviolet ray irradiation apparatus 1 is equipped with a chamber 2, an ultraviolet lamp 3 arranged in the chamber 2, a sample stage 5 which is arranged below the ultraviolet lamp 3 having a predetermined irradiation distance and on which a raw carbon nanotubes 4 are to be placed. The ultraviolet lamp 3 is supported by a platform member 6 which is arranged in the chamber 2. Moreover, the sample stage 5 is arranged on a freely adjustable elevating stage 7 and the above irradiation distance can be adjusted by moving the elevating stage 7 up and down.

The ultraviolet ray may be any ray having a wavelength of less than 400 nm but is preferably a far ultraviolet ray having a wavelength ranging from 1 to 190 nm. Since the bonding energy of the carbon-carbon bond forming $sp^2$ bonding is 590 kJ/mol, the carbon-carbon bond can be easily cleaved by the photon energy of the ultraviolet ray having a wavelength of the above range. When the wavelength of the ultraviolet ray is more than 190 nm, the carbon-carbon bond cannot be cleaved sometimes owing to the small energy of the ultraviolet ray. Moreover, when the wavelength is less than 1 nm, the ray falls within X-ray region, so that protection against X-ray becomes necessary.

The above ultraviolet lamp 3 for the ultraviolet ray irradiation includes a low-pressure mercury lamp, a dielectric barrier discharge excimer lamp, and the like. By the above low-pressure mercury lamp, an ultraviolet ray having a wavelength of 185 nm and an ultraviolet ray having a wavelength of 254 nm are obtained. In addition, by the above dielectric barrier discharge excimer lamp, an ultraviolet ray having a single wavelength of 126 nm, 146 nm, 172 nm, 222 nm, or 308 nm is obtained. In the present embodiment, because of the high photon energy, a vacuum ultraviolet ray having a wavelength of 172 nm obtainable by the irradiation from a dielectric barrier discharge excimer lamp in which xenon gas is included can be particularly preferably employed.

The irradiation of the carbon nanotubes 4 with an ultraviolet ray by means of the ultraviolet lamp 3 is carried out at an output ranging from 1 to 200 mW/cm$^2$ at an irradiation distance ranging from 0.1 to 100 mm over a period ranging from 5 to 600 seconds, the atmosphere in the chamber 2 being replaced with a predetermined one. In the carbon nanotubes 4, the carbon-carbon bond on the surface is cleaved and, at the same time, the end parts are opened. Carbon atoms at the cleaved parts and the opened parts combine with oxygen atoms, nitrogen atoms, and the like in the atmosphere to form hydrophilic functional groups, and thereby the hydrophilic functional groups are introduced into the above carbon nanotubes.

Examples of the hydrophilic functional groups include a hydroxyl group (—OH), a carbonyl group (—CO—), an aldehyde group (—CHO), a carboxyl group (—COOH), a nitro group (—NO$_2$), an amino group (—NH$_2$), and the like.

Moreover, in the case that the above raw carbon nanotubes are subjected to plasma treatment, the carbon nanotubes are arranged in a predetermined treating space, a predetermined gas is supplied thereto, and the carbon nanotubes are treated with plasma generated by applying a predetermined high voltage to the treating space for a determined period. The above plasma is a gas containing charged particles generated from ionization of the above gas by applying the above high voltage. In the above treatment with plasma, the above charged particles collide with the above carbon nanotubes to cleave the carbon-carbon bond on the surface of the carbon nanotubes and the carbon atoms at the cleaved parts combine with oxygen atoms, nitrogen atoms, or the like to form hydrophilic functional groups, and thereby, the hydrophilic functional groups are introduced in the above carbon nanotubes.

The gas to be supplied to the above treating space includes oxygen-containing gases, nitrogen-containing gases, hydrocarbon gases such as methane and ethylene, and the like but the oxygen-containing gases are preferred. When an oxygen-containing gas is employed, by the attack of electrons released from an electrode at the above plasma treatment, oxygen atoms ionize to form an atmosphere containing ozone and oxygen radicals. In such an atmosphere, ozone and oxygen radicals collide with the above carbon nanotubes to cleave the carbon-carbon bond on the surface of the carbon nanotubes and, in parallel, the carbon atoms at the cleaved parts rapidly combine with oxygen atoms. As a result, hydrophilic functional groups including oxygen such as a hydroxyl group (—OH), a carbonyl group (—CO—), an aldehyde group (—CHO), a carboxyl group (—COOH), and the like are introduced into the above carbon nanotubes.

The treating conditions such as kind of gases, pressure, applied voltage, frequency of electric source, period for applying the voltage to be used in the above plasma treatment can be suitably determined depending on the amount of the raw carbon nanotubes, desired degree of hydrophilicity, and the like.

Figure 2:
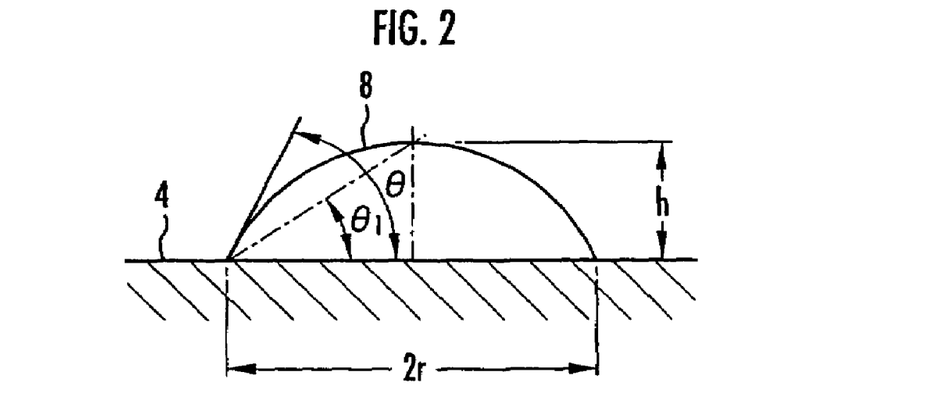
FIG. 2 is an illustrative cross-sectional view showing definition of a contact angle and a calculation method thereof.

As a result of the above ultraviolet irradiation or plasma treatment, hydrophilicity is imparted to the carbon nanotubes to such an extent that a contact angle of water toward the carbon nanotubes 4 are in the range of less than 130°, preferably 110° or less, further preferably 10° C. or less. The above contact angle is represented by an angle θ between a tangent line of a water drop 8 of distilled water and the surface of the carbon nanotubes 4, as shown in FIG. 2, when the water drop 8 is attached on the carbon nanotubes 4.

The contact angle θ is a value calculated according to the following equation (1) from an angle $θ_1$, the angle $θ_1$ represented by $\tan^{-1}$ (h/r) being measured by a commercially available contact angle meter when 4 μl or less of the water drop 8 is attached on the carbon nanotubes 4.

$$\text{Contact angle } θ = 2\tan^{-1}(h/r) = 2θ_1 \quad (1)$$

wherein h is a height from the surface of the carbon nanotubes 4 to the top of the water drop 8 and r is a radius of the plane of the water drop 8 which comes into contact with the surface of the carbon nanotubes 4.

The synthetic resin which forms the composite material together with the hydrophilic carbon nanotubes may be a thermoplastic resin or a thermosetting resin. Examples of the thermosetting resin include epoxy resins, phenol resins, melamine resins, furan resins, unsaturated polyester resins, and the like.

Figure 3:
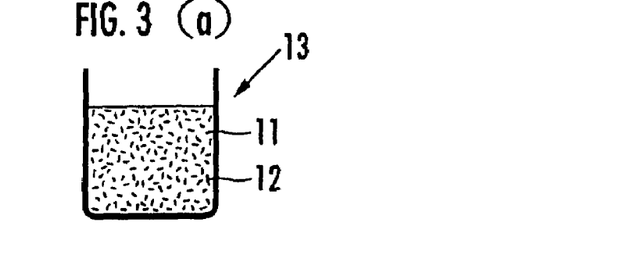
FIG. 3 is a step illustration schematically showing steps of the production process of the present embodiment.

In the production process of the present embodiment, as shown in FIG. 3(a), the hydrophilic carbon nanotubes 12 are first dispersed in the first solvent 11 to prepare a first dispersion liquid 13. For example, the ratio of the hydrophilic carbon nanotubes 12 to the first solvent 11 is in the range of 1/100 to 1/3 by weight.

For dispersing the hydrophilic carbon nanotubes 12, the first solvent 11 is preferably a polar organic solvent and further preferably has a high solubility of the monomer or prepolymer of the synthetic resin raw material. Examples of such a polar organic solvent include acetone, chloroacetone, dimethylformamide, pyridine, and the like.

At this time, in order to facilitate the dispersion of the hydrophilic carbon nanotubes 12, a surfactant may be added to the first solvent 11. For example, the ratio of the surfactant to the hydrophilic carbon nanotubes 12 is in the range of 5/1 to 20/1 by weight.

Examples of the above surfactant include sodium dodecylbenzenesulfonate, sodium dodecyl sulfate, sodium octylbenzenesulfonate, alkylsulfonate salts, sodium polyoxyethylene alkyl ether sulfate, benzalkonium chloride, alkyltrimethylammonium chloride, octylphenol ethoxylates (e.g., Triton X-100 (trade name) manufactured by Dow Chemical Co.), and the like. The surfactant preferably has a large molecular weight for preventing aggregation of the hydrophilic carbon nanotubes 12 and further preferably contains a benzene ring in the molecule for enriching electron affinity with the six-membered ring structure of carbon atoms in the hydrophilic carbon nanotubes 12.

Then, as shown in FIG. 3(b), the first dispersion liquid 13 and the synthetic resin raw material 15 are added to a second solvent 14, followed by mixing. The second solvent 14 has volume larger than that of the first solvent 11 and the ratio of the second solvent 14 to the first solvent 11 is, for example, in the range of 5/1 to 20/1 by weight.

Moreover, at this time, the hydrophilic carbon nanotubes 12 in the first dispersion liquid 13 are used relative to the synthetic resin raw material 15 in the second solvent 14 so that the ratio of the hydrophilic carbon nanotubes 12 to the synthetic resin raw material 15 is in the range of 1/100 to 1/5 by weight.

Furthermore, the second solvent 14 is substantially not compatible to the first solvent 11 and has smaller solubility of the synthetic resin raw material 15 than that of the first solvent 11, the raw material being a monomer or prepolymer of the above synthetic resin. Such a second solvent 14 is preferably a non-polar or a little polar organic solvent and examples thereof include hexane, chloronaphthalene, tetrachloroethane, styrene, benzene, and the like.

When the first dispersion liquid 13 and the synthetic resin raw material 15 are added to the second solvent 14 and the whole is mixed, the second solvent 14 has a larger volume than that of the first solvent 11 and is substantially not compatible to the first solvent 11, so that the first dispersion liquid 13 forms minute liquid drops to be dispersed in the second solvent 14. On the other hand, the synthetic resin raw material 15 initially dissolves in the second solvent 14 as shown in FIG. 3(b) by a dotted line, but the synthetic resin raw material 15 migrates to the first solvent 11 from the second solvent 14 since the second solvent 14 has a smaller solubility of the synthetic resin raw material 15 than that of the first solvent 11.

As a result, as shown in FIG. 3(c), there is formed a third dispersion liquid 17 where minute liquid drops of the second dispersion liquid 16 are dispersed in the second solvent 14. In the second dispersion liquid 16, as shown in FIG. 3(d) with magnification, the hydrophilic carbon nanotubes 12 are dispersed in the first solvent 11 in which the synthetic resin raw material 15 is dissolved.

At this time, all the synthetic resin raw material 15 may not necessarily migrate to the first solvent 11 from the second solvent 14 and part thereof may remain in the second solvent 14.

In order to form the third dispersion liquid 17, the first dispersion liquid 13 may be added to the second solvent 14 and then the synthetic resin raw material 15 may be added thereto, followed by stirring. Contrarily, the synthetic resin raw material 15 may be added to the second solvent 14 and then the first dispersion liquid 13 may be added thereto, followed by stirring.

By further continuation of stirring of the third dispersion liquid 17, the hydrophilic carbon nanotubes 12 are homogeneously mixed with the synthetic resin raw material 15 in the second dispersion liquid 16, whereby the second dispersion liquid 16 is converted into gel. Thus, when the second dispersion liquid 16 has been converted into gel, the first solvent 11 and the second solvent 14 are removed from the third dispersion liquid 17 and a mixture where the hydrophilic carbon nanotubes 12 are homogeneously mixed with the synthetic resin raw material 15 (not shown in the figure) is taken out. Herein, in the case that part of the synthetic resin raw material 15 remains in the second solvent 14, the remaining synthetic resin raw material 15 is removed together with the second solvent. Then, by molding the above mixture, a composite material (not shown in the figure) where the synthetic resin is reinforced with the hydrophilic carbon nanotubes is formed.

The operation of removing the first solvent 11 and the second solvent 14 from the third dispersion liquid 17 can be carried out by filtration or centrifugation of the third dispersion liquid 17. Then, by subjecting the above mixture thus obtained to injection molding or press molding, the above composite material can be formed.

The composite material can be also formed by spraying the third dispersion liquid 17 on a substrate. By the operation of spraying the third dispersion liquid 17 on the substrate, the molding of the above mixture can be carried out simultaneously with the removal of the first solvent 11 and the second solvent 14 from the third dispersion liquid 17. Moreover, even when the above substrate has a complex shape, the molding of the mixture can be carried out along the shape.

In addition, according to the operation of spraying the third dispersion liquid 17 on the substrate, by combining the operation with an operation of spraying other dispersion liquid and solution, a composite material layer where a plurality of materials are laminated can be easily formed.

Figure 4:
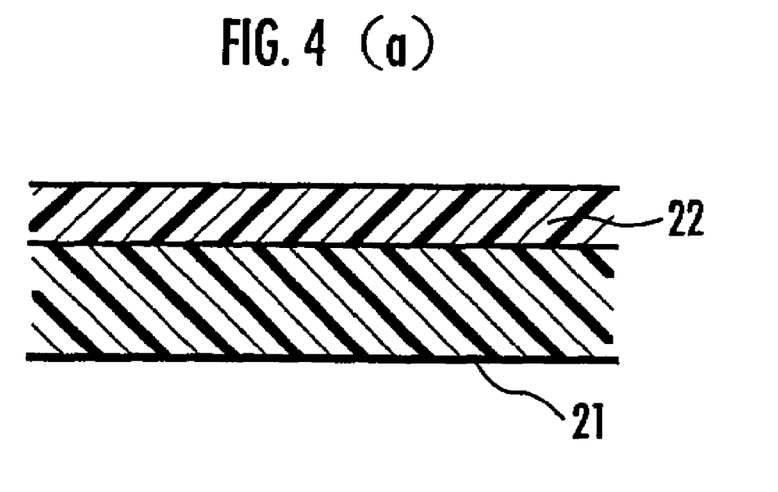
FIG. 4 is an illustrative cross-sectional view showing one constitutive example of the composite material reinforced with hydrophilic carbon nanotubes obtained by the production process of the present embodiment.

For example, a dispersion liquid A in which the hydrophilic carbon nanotubes are dispersed in a polar organic solvent and a solution B in which a synthetic resin is dissolved in a non-polar organic solvent are prepared. First, the dispersion liquid A is sprayed on a substrate and then the solution B is sprayed on the substrate. By these operations, as shown in FIG. 4(a), a first composite material layer 22 comprising a mixture of the hydrophilic carbon nanotubes contained in the dispersion liquid A and the synthetic resin contained in the solution B is formed on the substrate 21.

Then, the third dispersion liquid 17 of the present embodiment is sprayed on the composite material layer 22. As a result, as shown in FIG. 4(b), a second composite material layer 23 formed by removing the first solvent 11 and the second solvent 14 from the third dispersion liquid 17 is formed on the composite material layer 22, whereby a laminated composite material layer 24 where the composite material layers 22 and 23 are laminated is formed on the substrate 21.

At the formation of the laminated composite material layer 24, tanks separately containing the dispersion liquid A, the solution B, and the third dispersion liquid 17 and a spray gun are connected through a valve in a freely switchable manner, and the dispersion liquid A, the solution B, and the third dispersion liquid 17 may be sprayed from the spray gun in this order by switching the valve. Alternatively, tanks separately containing the dispersion liquid A, the solution B, and the third dispersion liquid 17 are sequentially attached to a spray gun and then the dispersion liquid A, the solution B, and the third dispersion liquid 17 may be sprayed from the spray gun in this order.

The following will show Examples and Comparative examples of the present invention.

EXAMPLE 1

In the present example, carbon nanotubes were produced by a chemical vapor deposition method (CVD method) as follows. In the chemical vapor deposition method, an Fe catalyst having a particle size of 30 nm supported on a $Al_2O_3$ support was first attached onto quartz wool placed in a reactor tube made of quartz glass and the whole was heated to 750° C. under an argon atmosphere. Next, a mixed gas of argon/hydrogen was passed through the reactor tube at a space velocity of 10 cm/second and also hexane as a carbon source was introduced into the reactor tube at a rate of 6 ml/minutes in a state dispersed in the mixed gas of argon/hydrogen. Thus, the hexane introduced into the reactor tube was reacted at 750° C. for 2 hours in the presence of the Fe catalyst. As a result, multilayered carbon nanotubes having a purity of 80% were obtained.

Next, the multilayered carbon nanotubes having a purity of 80% were subjected to hot oxidation treatment at 500° C. for 20 minutes in the air to remove amorphous carbon produced simultaneously with the multilayered carbon nanotubes. Then, the multilayered carbon nanotubes were immersed in a 6 mol/l sodium hydroxide solution and allowed to stand for 24 hours to remove the $Al_2O_3$ support. Furthermore, the multilayered carbon nanotubes were washed with 6 mol/l hydrochloric acid to remove the Fe catalyst to obtain multilayered carbon nanotubes having a purity of 97%.

Subsequently, as post treatment, the multilayered carbon nanotubes having a purity of 97% were placed in a graphite crucible and held at a temperature of 2000° C. for 5 hours in a vacuum furnace of 0.01 Pa, followed by cooling to room temperature in vacuo. As a result, multilayered carbon nanotubes having a diameter of 30 nm and an aspect ratio of 100 were obtained. The multilayered carbon nanotubes formed an aggregate.

Next, 0.3 g of the aggregate of the multilayered carbon nanotubes obtained as mentioned above were immersed in 500 ml of 99.5% ethanol and irradiated with an ultrasonic wave of an output of 150 W for 1 hour to be dispersed. Then, using a disk filter made of polytetrafluoroethylene having a diameter of 47 mm, the above multilayered carbon nanotubes were separated by filtration. Thereafter, the multilayered carbon nanotubes were dried on the above filter to obtain a disk of the carbon nanotubes. The disk had a diameter of 47 mm and a thickness of 0.3 mm.

Then, the above disk was placed, as raw carbon nanotubes 4, on the sample stage 5 of the ultraviolet ray irradiation apparatus 1 and irradiated with an ultraviolet ray by means of an ultraviolet lamp 3.

In the present example, using a xenon gas-included dielectric barrier discharge excimer lamp manufactured by Ushio Inc. as the ultraviolet lamp 3, hydrophilic carbon nanotubes were produced by irradiation with an ultraviolet ray of 172 nm in the air. The ultraviolet ray was applied under conditions of an output of 17.7 mW/cm$^2$ and an irradiation distance of 1 mm for 60 seconds.

Next, on the hydrophilic carbon nanotubes obtained as mentioned above, a contact angle θ of water toward the carbon nanotubes were measured. The contact angle θ is calculated according to the above equation (1) from the angle $θ_1$ obtained by dropping 2 μl of distilled water on the surface of the disk of the resulting hydrophilic carbon nanotubes and measuring an angle $θ_1$ by means of a contact angle meter (360D (trade name) manufactured by ERMA Inc.). In the present Example, the distilled water dropped on the surface of the disk of the hydrophilic carbon nanotubes soaked into the above disk within 1 second and thus the contact angle θ was 0°.

Then, 10 mg of the hydrophilic carbon nanotubes obtained as mentioned above were added to 10 ml of acetone as a first solvent, and 100 mg of sodium dodecylbenzenesulfonate was further added as a surfactant, followed by stirring with a magnetic stirrer. As a result, as shown in FIG. 3(a), a first dispersion liquid 13 where the hydrophilic carbon nanotubes 12 are dispersed in the first solvent (acetone) was obtained.

Thereafter, the first dispersion liquid 13 was charged into 100 ml of n-hexane as a second solvent 14, and 990 mg of a bisphenol A type epoxy resin (Epikote 827 (trade name) manufactured by Japan Epoxy Resin Co., Ltd.) and 330 mg of a modified aliphatic amine epoxy resin hardener (Epikure 113 (trade name) manufactured by Japan Epoxy Resin Co., Ltd.) were further added thereto, followed by continuation of stirring.

At this time, the bisphenol A type epoxy resin and the modified aliphatic amine epoxy resin hardener are easy to dissolve in acetone than n-hexane. Therefore, the bisphenol A type epoxy resin and the modified aliphatic amine epoxy resin hardener dissolves in n-hexane immediately after the addition but, while the continuation of stirring, they migrate from n-hexane into acetone.

As a result, as shown in FIG. 3(c), a third dispersion liquid 17 where minute liquid drops of the second dispersion liquid 16 was dispersed in the second solvent (n-hexane) 14 was formed. In the above second dispersion liquid 16, as shown in FIG. 3(d) with magnification, the synthetic resin raw material (the bisphenol A type epoxy resin and the modified aliphatic amine epoxy resin hardener) 15 were dissolved and further the hydrophilic carbon nanotubes 12 were dispersed in the first solvent (acetone).

At this time, the second dispersion liquid 16 shows black color and thus the third dispersion liquid is apparently seen as if a black solution. After continuation of further 1 hour stirring in this state, upon stopping the stirring, the solution became in a state where gel-like black precipitate was formed in a clear solution. The black precipitate is a mixture of the hydrophilic carbon nanotubes 12 and the synthetic resin raw material 15.

Next, the clear solution was centrifuged to separate the above black precipitate that was a mixture of the hydrophilic carbon nanotubes 12 and the synthetic resin raw material 15 and the mixture was subjected to press molding at a temperature of 80° C. under a pressure of 1 MPa for 1 hour to obtain a film-shape molded article. Then, the molded article was treated at 140° C. for 3 hours in a vacuum drying oven to obtain a thermosetting resin composite material reinforced with the hydrophilic carbon nanotubes.

Thereafter, the thermosetting resin composite material reinforced with the hydrophilic carbon nanotubes was crushed into pieces having about 1 mm square and, after dispersed in ethanol by an ultrasonic washer, the pieces were observed at a magnification of 75000 times. As a result, in the above composite material, it was confirmed that individual hydrophilic carbon nanotubes were homogeneously dispersed in the resin of the composite material and the epoxy resin was attached to the surface of the hydrophilic carbon nanotubes.

COMPARATIVE EXAMPLE 1

Ten mg of the hydrophilic carbon nanotubes obtained in Example 1 was charged into 100 ml of acetone and dispersed by stirring with a magnetic stirrer to prepare a dispersion liquid. Then, 990 mg of the bisphenol A type epoxy resin and 330 mg of the epoxy resin hardener the same as those used in Example 1 were added to the dispersion liquid, followed by 2 hours of stirring.

Next, the resulting dispersion liquid was cast into film and, after allowed to stand at room temperature for 24 hours, the film was treated at 140° C. for 3 hours in a vacuum drying oven to obtain a thermosetting resin composite material reinforced with the hydrophilic carbon nanotubes.

Then, the thermosetting resin composite material reinforced with the hydrophilic carbon nanotubes was crushed into pieces having about 1 mm square and, after dispersed in ethanol by an ultrasonic washer, the pieces were observed at a magnification of 75000 times. As a result, in the above composite material, it was confirmed that a large number of the hydrophilic carbon nanotubes were intertwined to form an aggregate and were not homogeneously dispersed in the resin of the composite material and the clumpy epoxy resin was attached to the surface of the aggregate.

EXAMPLE 2

Three kinds of thermosetting resin composite materials reinforced with the hydrophilic carbon nanotubes were obtained in the same manner as in Example 1 except that the amount of the hydrophilic carbon nanotubes was changed to 27 mg, 69 mg, and 233 mg.

Next, a test piece having a size of 10 mm width, 80 mm length, and 2 mm thickness was cut from each of the above composite materials. Then, a strain gauge was adhered to the test piece and subjected to a tensile test using a universal tensile testing machine manufactured by Shimadzu Corporation, whereby tensile modulus of each composite material was determined. The results were shown in Table 1.

COMPARATIVE EXAMPLE 2

A thermosetting resin material was obtained in the same manner as in Example 1 except that no hydrophilic carbon nanotube was used.

Then, a tensile test was carried out in the same manner as in Example 2 except that the thermosetting resin material obtained in the present Comparative Example was used, whereby tensile modulus of the composite material was determined. The results were shown in Table 1.

COMPARATIVE EXAMPLE 3

Two kinds of thermosetting resin composite materials reinforced with the hydrophilic carbon nanotubes were obtained in the same manner as in Comparative Example 1 except that the amount of the hydrophilic carbon nanotubes was changed to 69 mg and 233 mg.

Then, a tensile test was carried out in the same manner as in Example 2 except that the thermosetting resin materials obtained in the present Comparative Example was used, whereby tensile modulus of each composite material was determined. The results were shown in Table 1.

TABLE 1 unit: GPa

| Hydrophilic CNT (mg) | Epoxy resin (mg) | Added ratio of hydrophilic CNT (wt %) | Example 2 | Comp. Example 2 | Comp. Example 3 |
|---|---|---|---|---|---|
| 0 | 1320 | 0 | — | 0.45 | — |
| 27 | 1320 | 2 | 0.71 | — | — |
| 69 | 1320 | 5 | 1.55 | — | 0.52 |
| 233 | 1320 | 15 | 2.23 | — | 0.75 |

CNT: carbon nanotubes

From Table 1, it is apparent that the thermosetting resin composite material reinforced with the hydrophilic carbon nanotubes (Example 2) obtained by the production process of the invention possesses an excellent mechanical strength (tensile modulus) as compared with the thermosetting resin material (Comparative Example 2) comprising the epoxy resin alone where no hydrophilic carbon nanotube is used.

Moreover, it is apparent that the thermosetting resin composite material reinforced with the hydrophilic carbon nanotubes (Example 2) obtained by the production process of the invention possesses an excellent mechanical strength (tensile modulus) as compared with the thermosetting resin material reinforced with the hydrophilic carbon nanotubes (Comparative Example 3) which is not produced by the production process of the invention.

EXAMPLE 3

In the present Example, 10 mg of the aggregate of the multilayered carbon nanotubes obtained in Example 1 was subjected to direct-current low-temperature plasma treatment (10 W, 1 A, 5 minutes) in an oxygen atmosphere of 26.6 Pa to obtain hydrophilic carbon nanotubes.

Next, a third dispersion liquid 17 where minute liquid drops of a second dispersion liquid 16 were dispersed in the second solvent (n-hexane) 14, as shown in FIG. 3(c), was obtained in the same manner as in Example 1 except that 10 mg of the hydrophilic carbon nanotubes obtained as mentioned above, 10 ml of dimethylformamide instead of acetone, and 990 mg of an unsaturated polyester resin instead of the epoxy resin as a synthetic resin raw material were used. In the second dispersion liquid 16, as shown in FIG. 3(d) with magnification, the synthetic resin raw material (unsaturated polyester resin) 15 is dissolved in the first solvent (dimethylformamide) 11 and the hydrophilic carbon nanotubes 12 are further dispersed therein.

Then, the third dispersion liquid 17 further stirred for 24 hours was sprayed by a spray gun on a substrate made of an epoxy resin having a size of 1 cm length, 3 cm width, and 0.2 cm thickness so as to be a thickness of 0.1 cm, followed by heating at 40° C. for 12 hours. As a result, a laminate having a hydrophilic carbon nanotube-reinforced thermosetting composite material layer having a thickness of 0.3 cm on the substrate made of the epoxy resin was obtained.

What is claimed is:

1. A method of manufacturing a carbon nanotube reinforced composite material comprising hydrophilic carbon nanotubes and a synthetic resin, comprising the steps of:
    dispersing the hydrophilic carbon nanotubes in a first solvent to prepare a first dispersion liquid,
    adding the first dispersion liquid and a synthetic resin raw material to a second solvent and stirring the resulting mixture to prepare a third dispersion liquid where a second dispersion liquid in which the synthetic resin raw material is dissolved in the first dispersion liquid is dispersed in the second solvent,
    removing the first solvent and the second solvent from the third dispersion liquid to obtain a mixture of the hydrophilic carbon nanotubes and the synthetic resin raw material, and
    molding the mixture to obtain the composite material where the synthetic resin is reinforced with the hydrophilic carbon nanotubes,
    wherein the second solvent has smaller solubility of the synthetic resin raw material than that of the first solvent, is substantially not compatible to the first solvent, and has volume larger than that of the first solvent.

2. The method of manufacturing a carbon nanotube reinforced composite material according to claim 1, wherein the hydrophilic carbon nanotubes are obtained by introducing a hydrophilic functional group into the surface of raw carbon nanotubes by irradiating the raw carbon nanotubes with an ultraviolet ray.

3. The method of manufacturing a carbon nanotube reinforced composite material according to claim 1, wherein the hydrophilic carbon nanotubes are obtained by introducing a hydrophilic functional group into the surface of raw carbon nanotubes by subjecting the raw carbon nanotubes to plasma treatment.

4. The method of manufacturing a carbon nanotube reinforced composite material according to claim 1, wherein the hydrophilic carbon nanotubes are obtained by introducing a hydrophilic functional group into the surface of raw carbon nanotubes by subjecting the raw carbon nanotubes to wet treatment with a strong oxidizing agent.

5. The method of manufacturing a carbon nanotube reinforced composite material according to claim 1, wherein the synthetic resin is a thermoplastic resin.

6. The method of manufacturing a carbon nanotube reinforced composite material according to claim 1, wherein the synthetic resin is a thermosetting resin.

7. The method of manufacturing a carbon nanotube reinforced composite material according to claim 6, wherein the thermosetting resin is at least one resin selected from the group consisting of epoxy resins, phenol resins, melamine resins, furan resins, and unsaturated polyester resins.

8. The method of manufacturing a carbon nanotube reinforced composite material according to claim 1, wherein the hydrophilic carbon nanotubes are dispersed in the first solvent so that the ratio of the hydrophilic carbon nanotubes to the first solvent is in the range of 1/100 to 1/3 by weight.

9. The method of manufacturing a carbon nanotube reinforced composite material according to claim 1, wherein the first solvent is one solvent selected from the group consisting of acetone, chloroacetone, dimethylformamide, and pyridine.

10. The method of manufacturing a carbon nanotube reinforced composite material according to claim 1, wherein a surfactant is added to the first solvent.

11. The method of manufacturing a carbon nanotube reinforced composite material according to claim 10, wherein the surfactant is added to the first solvent so that the ratio of the surfactant to the hydrophilic carbon nanotubes in the first dispersion liquid is in the range of 5/1 to 20/1 by weight.

12. The method of manufacturing a carbon nanotube reinforced composite material according to claim 10, wherein the surfactant is one compound selected from the group consisting of sodium dodecylbenzenesulfonate, sodium dodecyl sulfate, sodium octylbenzenesulfonate, alkylsulfonate salts, sodium polyoxyethylene alkyl ether sulfate, benzalkonium chloride, alkyltrimethylammonium chloride, and octylphenol ethoxylates.

13. The method of manufacturing a carbon nanotube reinforced composite material according to claim 1, wherein the second solvent is used so that the ratio of the second solvent to the first solvent is in the range of 5/1 to 20/1 by weight.

14. The method of manufacturing a carbon nanotube reinforced composite material according to claim 13, wherein the hydrophilic carbon nanotubes in the first dispersion liquid are used relative to the synthetic resin raw material in the second solvent so that the ratio of the hydrophilic carbon nanotubes to the synthetic resin raw material is in the range of 1/100 to 1/5 by weight.

15. The method of manufacturing a carbon nanotube reinforced composite material according to claim 1, wherein the synthetic resin raw material is a monomer of the synthetic resin.

16. The method of manufacturing a carbon nanotube reinforced composite material according to claim 1, wherein the synthetic resin raw material is a prepolymer of the synthetic resin.

17. The method of manufacturing a carbon nanotube reinforced composite material according to claim 1, wherein the second solvent is one solvent selected from the group consisting of hexane, chloronaphthalene, tetrachloroethane, styrene, and benzene.

18. The method of manufacturing a carbon nanotube reinforced composite material according to claim 1, wherein the first solvent and the second solvent are removed from the third dispersion liquid by filtering the third dispersion liquid to obtain the mixture of the hydrophilic carbon nanotubes and the synthetic resin raw material.

19. The method of manufacturing a carbon nanotube reinforced composite material according to claim 1, wherein the first solvent and the second solvent are removed from the third dispersion liquid by centrifuging the third dispersion liquid to obtain the mixture of the hydrophilic carbon nanotubes and the synthetic resin raw material.

20. The method of manufacturing a carbon nanotube reinforced composite material according to claim 1, wherein the composite material is obtained by subjecting the mixture of the hydrophilic carbon nanotubes and the synthetic resin raw material to injection molding.

21. The method of manufacturing a carbon nanotube reinforced composite material according to claim 1, wherein the composite material is obtained by subjecting the mixture of the hydrophilic carbon nanotubes and the synthetic resin raw material to press molding.

22. The method of manufacturing a carbon nanotube reinforced composite material according to claim 1, wherein the first solvent and the second solvent are removed from the third dispersion liquid by spraying the third dispersion liquid on a substrate to obtain the mixture of the hydrophilic carbon nanotubes and the synthetic resin raw material and the mixture is simultaneously molded to obtain the composite material.

* * * * *